Dec. 5, 1933.   A. JOHANSON   1,937,895
ANIMAL WEANER
Filed Dec. 21, 1931
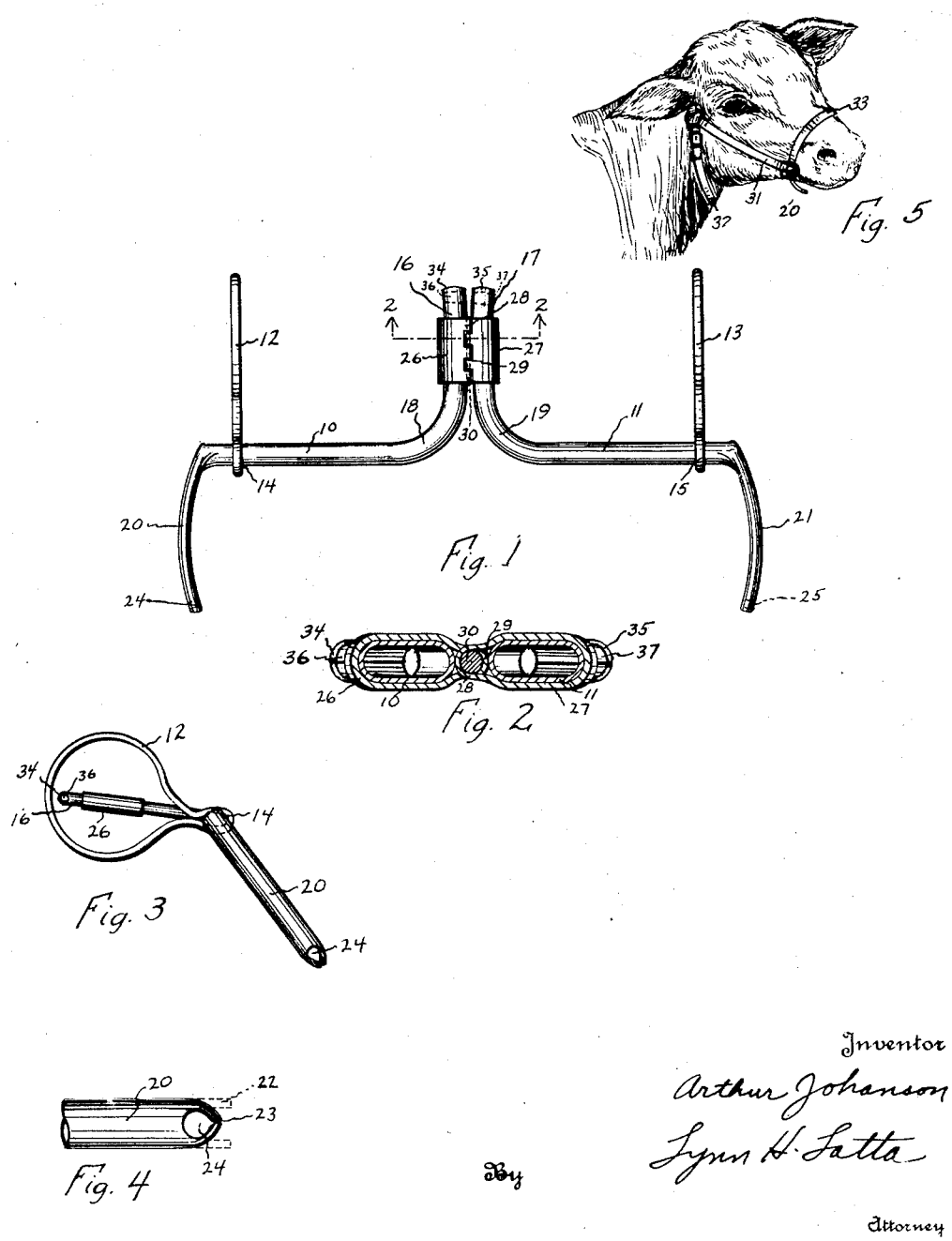
Inventor
Arthur Johanson
Lynn H. Latta
By
Attorney Patented Dec. 5, 1933

1,937,895

UNITED STATES PATENT OFFICE 1,937,895

ANIMAL WEANER

Arthur Johanson, Allen, Nebr.

Application December 21, 1931
Serial No. 582,326

1 Claim. (Cl. 119—134)

My invention relates to a weaner and has as its object to provide a weaner, which can be used for a variety of animals, especially calves or cows and is made so as to provide features which are superior to other weaners.

Another object of my invention is to provide a weaner which will work positively without clogging of any of its functioning tubes.

Another object of my invention is to provide a weaner which will insure the animal drawing in air instead of drawing milk.

Another object of my invention is to provide a weaner which will be flexible so that it will not inconvenience the animal in eating or drinking apart from its specified use.

Another object of my invention is to provide such a weaner which will accomplish the above results and at the same time be of a simple construction so that it can be manufactured at a reasonable cost.

With these and other objects in view, my invention consists in the construction, arrangement, and combination of the various parts of my device, whereby the objects contemplated are attained, as hereinafter more fully set forth, pointed out in my claim, and illustrated in the accompanying drawing, in which:

Figure 1 is a plan view of the weaner,

Figure 2 is a sectional view taken along the line 2—2 of Figure 1,

Figure 3 is a side elevational view of the weaner,

Figure 4 is an enlarged detailed view of the end of the weaner, and

Figure 5 shows the weaner attached in the mouth of the animal.

I have used the reference characters 10 and 11 to indicate generally the main tubular portions of the device. These portions are made of hollow, flattened out tubes, the section of which is illustrated in Figure 2.

I provide the loops 12 and 13, which are crimped down to clasp the portions 10 and 11 at the points 14 and 15.

The loops 12 and 13 are primarily circular in shape until they are crimped to this form.

The tubes 10 and 11 include the bent out portions 16 and 17, which diverge slightly at their inner ends as shown, and these portions 10 and 11 are further bent in the form shown at 18 and 19. They are bent in the curvature shown at 18 and 19, which curvature is made uniform enough so as not to constrict the passage of the tube too much when the animal is sucking milk.

At the extremities of the portions 10 and 11, I provide the bent and slightly arced portions 20 and 21.

An examination of Figure 3 will show how these portions are bent downwardly away from the main body of the tube. These portions are bent at an angle of substantially 45° from the plane of the flattened out tube.

It will be seen that this can be readily formed by placing the tube flat on a table or bench and holding it with a vice and then merely bending this portion downwardly so that the plane of the longer axis of the hollow tube will be practically parallel to the mouth of the animal.

The end of these prongs 20 and 21 are formed as shown in Figure 4. The ends 34 and 35 are formed in the same manner.

The tube is merely sawed out to the shape indicated generally in the dotted figure at 22 and then the ends are bent over as at 23 and firmly driven together. This leaves the openings 24 and 25 open to the air, and also the openings 36 and 37.

It will be seen that these openings are facing outwardly when the device is attached to the animal's mouth. The reason for this is to prevent an undue accumulation of dirt and other matter when the animal is grazing and so forth.

For providing flexibility to the device, I provide the hinges 26 and 27. These hinges are made similar to the usual door hinge and are made of round tubular material which is pressed firmly against the tube portion of the weaner. (See Figure 2).

Extended portions 28 and 29 are arranged to be received, one within the other, and a pin 30 is passed through these portions. This arrangement provides a hinging action about the pin 30.

It will be seen from the construction of the upper part of the device that this hinging arrangement cannot slip off in either direction.

The loops 12 and 13 are fastened to the regular halter arrangement comprising the straps 31, 32, and 33 as shown in Figure 5.

We will now discuss features of my device, which are believed to present superior features in such devices.

It will be seen that when a young calf, for instance, is drawing milk from her mother's teats, that the portions 16 and 17 will always extend beyond the end of the teat. In this way the young animal will always draw in air instead of the milk, whereas if the teat extended beyond the portions 16 and 17, there would be a tendency for the animal to draw milk in instead, which result of course is the main result not desired.

Furthermore in any device of such character using openings in the tubular section which is inside of the mouth, there would be a pronounced tendency for portions of the mouth, such as the tongue and so forth, to constrict some of these openings, thereby rendering the device ineffective for its specified purpose.

I have tried this device and found it to fully provide for the aforementioned features, whereas a weaner using a straight bit has been ineffective.

It will be further seen that due to the hinging action, the weaner is flexible and has no tendency to inconvenience or harass the animal.

Furthermore the bit can be constantly worn during the weaning period, and the animal can conveniently eat or graze, or drink water, since the parts will not interfere with these processes in any way.

This device can also be used on older cows since there is sometimes a tendency for older cows or older animals to draw their own milk.

It will be seen that I have provided a weaner that is desirable from a standpoint of utility and remedies defects, which may be prevalent in other weaners.

It will be further seen that I have provided a weaner which is flexible and not too bothersome for the animal.

It will be seen finally that I have provided a weaning device which is simple and which can be manufactured at a very reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

A weaner for animals comprising, a pair of hollow tubes, a hinge element between the tubes, the inner ends of said tubes being bent to project inwardly in the mouth of an animal, a portion of the tubes adapted to be positioned across the mouth of an animal and the outer ends of the tubes being bent at substantially right angles to said portion, and said outer ends of the tubes having substantially cylindrical openings at their extremities, the axes of said openings being substantially parallel to the portion of the tubes positioned across the mouth of the animal.

ARTHUR JOHANSON.